No. 713,135. Patented Nov. 11, 1902.
H. B. MURDOCK.
SHAFT COUPLING.
(Application filed Nov. 15, 1901.)
(No Model.) 2 Sheets—Sheet 1.
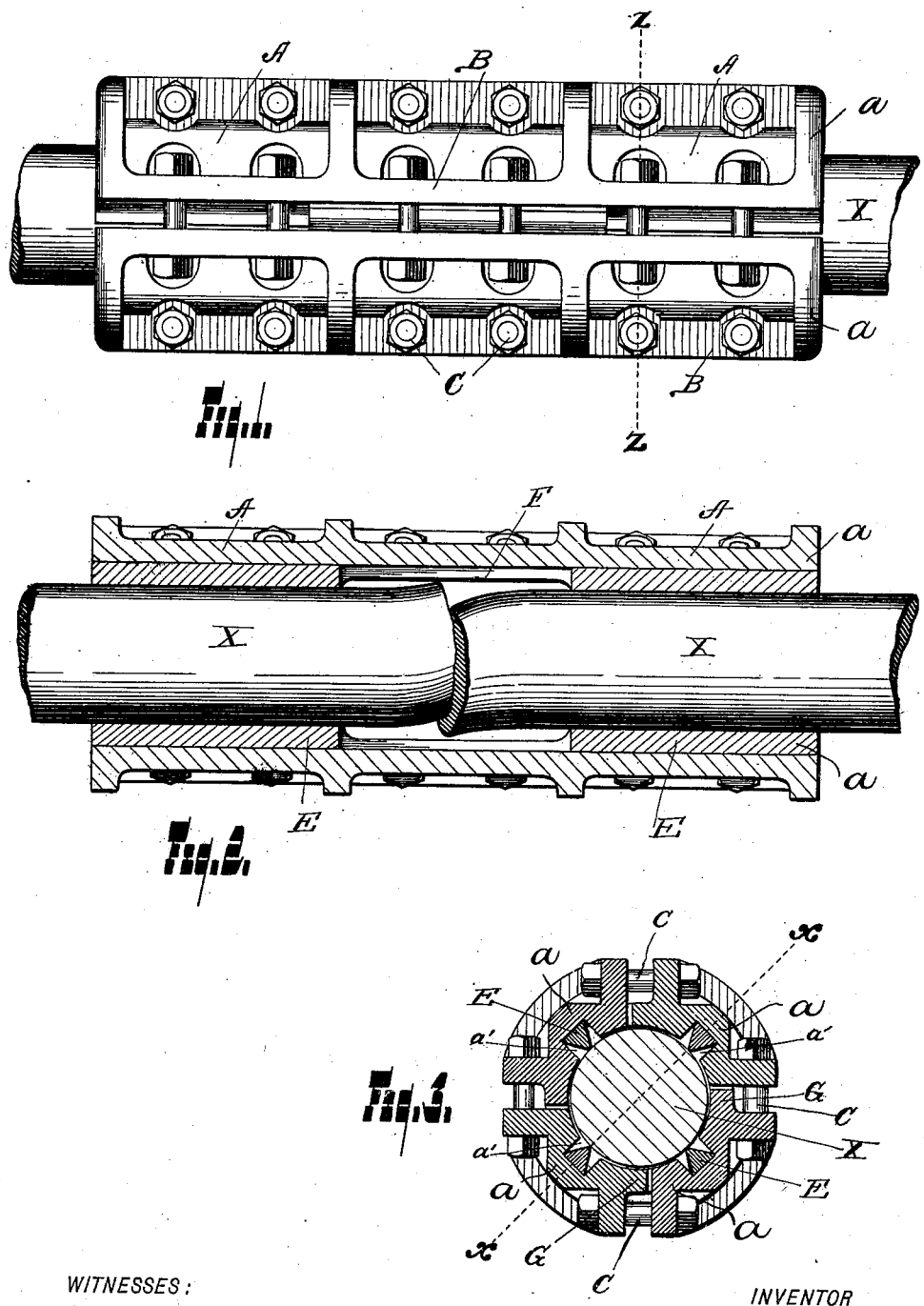

No. 713,135. Patented Nov. 11, 1902.
H. B. MURDOCK.
SHAFT COUPLING.
(Application filed Nov. 15, 1901.)
(No Model.) 2 Sheets—Sheet 2.
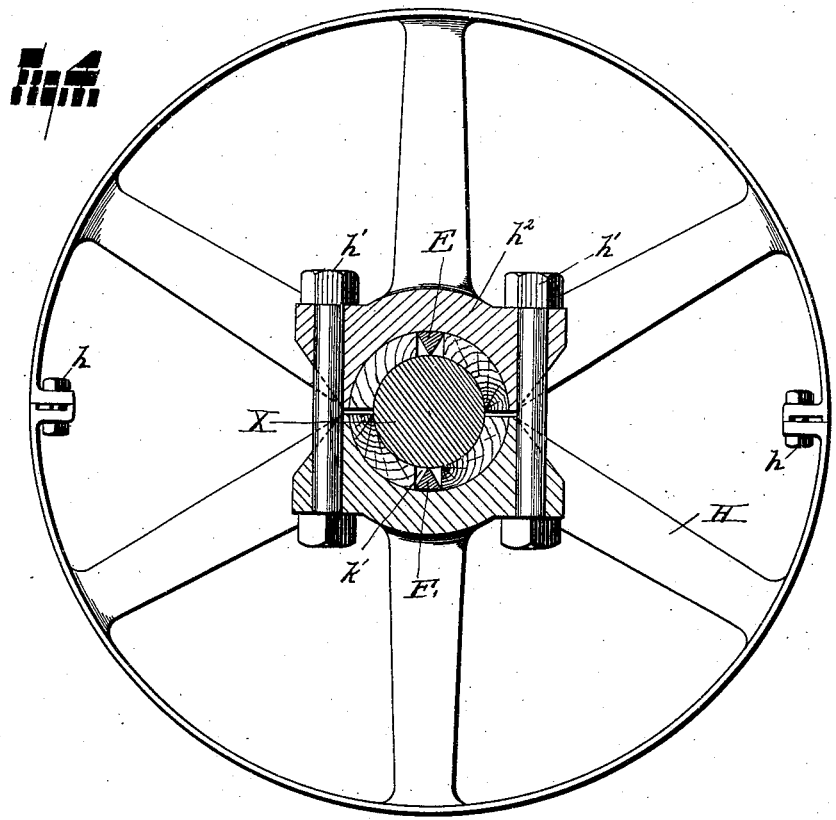
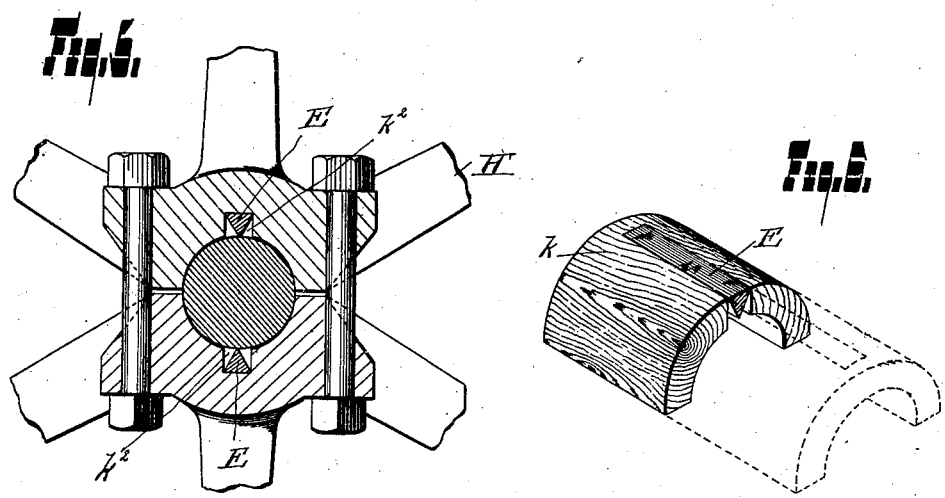

UNITED STATES PATENT OFFICE.

HORACE B. MURDOCK, OF DETROIT, MICHIGAN.

SHAFT-COUPLING.

SPECIFICATION forming part of Letters Patent No. 713,135, dated November 11, 1902.

Application filed November 15, 1901. Serial No. 82,439. (No model.)

*To all whom it may concern:*

Be it known that I, HORACE B. MURDOCK, a citizen of the United States, residing at Detroit, in the county of Wayne and State of Michigan, have invented certain new and useful Improvements in Shaft-Couplings; and I do hereby declare the following to be a full, clear, and exact description of the invention, such as will enable others skilled in the art to which it appertains to make and use the same.

My invention relates to improvements in shaft-couplings and the like, and has for its object certain features of novelty that will hereinafter appear.

Referring to the drawings, Figure 1 is a side elevation of the device applied to a shaft as a coupling. Fig. 2 represents a longitudinal section of the same on the line $x\,x$, Fig. 3. Fig. 3 represents a transverse section on the line $z\,z$ of Fig. 1. Fig. 4 represents an elevation, partly in section, of a pulley to which my invention is applied as a means for securing the pulley upon the shaft. Fig. 5 is a modified form of the same, and Fig. 6 is a detail perspective view of the bushing shown in Fig. 4.

Referring first to Figs. 1, 2, and 3, A represents a body or frame provided with ribs B B, through which bolts C C are adapted to pass, which when tightened clamp the device upon the shaft X, the said body portion A being composed of a plurality of sections $a\,a$, which when bolted together leave an opening for the insertion of the said shaft X. Within the walls of these sections $a\,a$ are provided one or more recesses $a'\,a'$, into which fit the triangular-shaped rods E E, the flat side of said rods resting in the recess and the point bearing upon the shaft X. The central portion of the body portion A is preferably recessed, as shown at F, Fig. 2, to enable the insertion of the device upon a shaft having distorted or twisted ends without difficulty. Flanges or extensions G G may be provided upon each of the sections $a\,a$ to prevent relative movement of the parts upon the shaft.

This device, as will be obvious, is designed as a shaft-coupling to be employed either temporarily in case of emergency, such as broken propeller-shafts on board ship, or, if desired, may be used permanently, the construction of the device being such that the same may be readily applied and removed from the shaft and at the same time providing a very effective clamp, as will hereinafter appear.

In Figs. 4, 5, and 6 my said invention is embodied in a clamp for split pulleys. In these views H represents an ordinary split pulley provided with the clamping-bolts $h\,h'$.

In Fig. 4 the hub $h^2$ of the pulley is bored out, as in the ordinary pulley, and the bushing K, composed of the segmental sections $k\,k$, are inserted. These segmental sections $k\,k$ are each provided with one or more recesses $k'\,k'$, into which are inserted the triangular rods, which bear against the shafting X when the clamping-screws $h'\,h'$ of the pulley are tightened.

In Fig. 5 the bushing K is dispensed with, the recesses $k^2$ being provided in the hub of the pulley, into which the rods E are inserted.

When the device is clamped upon the shaft, the pointed edge of the triangular rods E grip the shaft, and should any twisting force be exerted upon the shaft the said triangular rods will have a tendency to roll, causing them to exert a greater pressure upon the shaft. The greater the twisting force exerted the greater will be the pressure exerted upon the shaft to prevent any motion by the triangular rods E.

It will be obvious that to apply the device herein shown to a shaft for the purposes described it will be unnecessary to provide the usual keyways, as is usual, the device being clamped upon the shaft.

The device shown in Figs. 4 and 6 is adapted to be applied to any ordinary pulley, in which case the bushing K is employed.

While I have embodied my said invention in the forms shown and described, it will be obvious that with slight modifications my said invention may be applied in a variety of ways which will readily suggest themselves to any one skilled in the art.

Having thus described my invention, what I claim, and desire to secure by Letters Patent of the United States, is—

1. In a shaft-coupling or the like, the combination of two or more sections adapted to be clamped upon a shaft, and angular-faced gripping devices interposed between said sections and the shaft, the flat side of said grippers resting against the inner wall of said sections and an edge against the shaft, whereby any relative motion between the shaft and said sections will cause said grippers to roll, thereby wedging themselves firmly against the shaft.

2. In a device of the character described, the combination of a plurality of recessed sections, means for clamping said sections together upon a shaft, triangularly-shaped rods fitted into said recesses in each of said sections, the flat side of said rods resting against the back of the recess, and the point of the rods against the smooth surface of the shaft, the walls of the recesses of said sections constituting means for causing said rods to roll when relative motion between said shaft and sections takes place, causing a wedging action between the said sections and shaft.

3. In a device of the character described, the combination with a plurality of sections adapted to be clamped together upon a shaft; of a plurality of triangularly-shaped rods interposed between said sections and the shaft, the flat side of said rods resting against said sections, and the edges of said rods against the smooth surface of the shaft causing said rods to roll and wedge themselves between said sections and shaft when relative motion takes place between them.

In testimony whereof I affix my signature in presence of two witnesses.

HORACE B. MURDOCK.

Witnesses:
GUSTAVE HEINER,
H. H. HAGER.